(12) United States Patent
Müller et al.

(10) Patent No.: US 10,176,581 B2
(45) Date of Patent: Jan. 8, 2019

(54) IMAGE REGISTRATION METHOD AND APPARATUS

(71) Applicants: Huawei Technologies Co., ltd., Shenzhen (CN); Fraunhofer-Gesellschaft Zur Förderung Der Angewandten Forschung E.V., Munich (DE)

(72) Inventors: Marcus Müller, Munich (DE); Christian Riechert, Munich (DE); Ingo Feldmann, Munich (DE); Shan Gao, Shenzhen (CN); Yadong Lu, Shenzhen (CN)

(73) Assignees: Huawei Technologies Co., Ltd., Shenzhen (CN); Fraunhofer-Gesellschaft Zur Forderung Der Angewandten Forschung E.V., Munich (DE)

(*) Notice: Subject to any disclaimer, the term of this patent is extended or adjusted under 35 U.S.C. 154(b) by 205 days.

(21) Appl. No.: 14/981,571

(22) Filed: Dec. 28, 2015

(65) Prior Publication Data

US 2016/0203607 A1    Jul. 14, 2016

(30) Foreign Application Priority Data

Jan. 9, 2015   (CN) .......................... 2015 1 0012012

(51) Int. Cl.
    *G06T 7/80*     (2017.01)
    *G06T 7/00*     (2017.01)
    *G01B 11/00*    (2006.01)

(52) U.S. Cl.
    CPC .......... *G06T 7/0024* (2013.01); *G01B 11/002* (2013.01); *G06T 7/80* (2017.01);
    (Continued)

(58) Field of Classification Search
    CPC ..................... G06T 7/0024; G06T 7/80; G06T 2207/10052; G06T 2207/20021; G06T 2207/30244; G01B 11/002
    See application file for complete search history.

(56) References Cited

U.S. PATENT DOCUMENTS 8,547,374 B1 * 10/2013 Sadjadi ................... G06T 17/00
                                                         345/419
9,013,477 B2 * 4/2015 Schmeitz ............. H04N 5/2254
                                                         345/419
(Continued)

FOREIGN PATENT DOCUMENTS

CN         101582165 A      11/2009

OTHER PUBLICATIONS

Bouguet et al., "First calibration example—Corner extraction, calibration, additional tools," Camera Calibration Toolbox for Matlab, pp. 1-29 (Oct. 14, 2015).
(Continued)

*Primary Examiner* — Nhon T Diep
(74) *Attorney, Agent, or Firm* — Leydig, Voit & Mayer, Ltd.

(57) ABSTRACT

The present disclosure discloses an image registration method and apparatus. The method includes: determining a target plane; orthogonally projecting the optical center of each of the cameras in the planar camera array onto the target plane, to obtain a projected point of the optical center of each of the cameras; generating a rectangular grid on the target plane according to the projected points of the optical centers of the cameras in the planar camera array; obtaining a target grid point of each of the cameras according to the rectangular grid; determining a target camera coordinate system of each of the cameras; and registering, images collected by the cameras in the planar camera array. In embodiments of the present disclosure a target camera
(Continued)

coordinate system of a camera is determined again, thereby greatly reducing complexity of subsequent image registration.

20 Claims, 8 Drawing Sheets

(52) U.S. Cl.
CPC .............. *G06T 2207/10052* (2013.01); *G06T 2207/20021* (2013.01); *G06T 2207/30244* (2013.01)

(56) References Cited

U.S. PATENT DOCUMENTS 9,786,062 B2 * 10/2017 Sorkine-Hornung ........................ G06T 7/557
2014/0160246 A1 6/2014 Ma et al.

OTHER PUBLICATIONS

Vaish et al., "Using Plane + Parallax for Calibrating Dense Camera Arrays," Proceedings of the 2004 IEEE Computer Society Conference on Computer Vision and Pattern Recognition (CVPR'04), Washington, DC, Institute of Electrical and Electronics Engineers, New York, New York (Jun. 27-Jul. 2, 2004).
Maitre et al., "Symmetric Multi-View Stereo Reconstruction From Planar Camera Arrays," IEEE Conference on Computer Vision and Pattern Recognition, Anchorage, Alaska, pp. 1-8, Institute of Electrical and Electronics Engineers, New York, New York (Jun. 23-28, 2008).
Boutarel et al., "Epipolar Rectification for Autostereoscopic Camera Setup," The $8^{th}$ France-Japan and $6^{th}$ Europe-Asia Congress on Mechatronics, Yokohama, Japan, pp. 133-136 (Nov. 22-24, 2010).
Jang et al., "Hybrid optical system for three-dimensional shape acquisition," Applied Optics, vol. 52, Issue 16, pp. 3680-3688, Optical Society of America, Washington, D.C. (Jun. 1, 2013).
Yang et al., "A Real-Time Distributed Light Field Camera," Thirteenth Eurographics Workshop on Rendering, The Eurogaphics Association, Geneva, Switzerland (2002).
Zhang et al., "A Self-Reconfigurable Camera Array," Eurographics Symposium on Rendering, The Eurographics Association (2004).
Zhang et al., "A Survey on Image-Based Rendering—Representation, Sampling and Compression," Technical Report AMP 03-03, Carnegie Mellon University, Pittsburgh, Pennsylvania (Jun. 2003).
Riechert et al., "Advanced Interpolation Filters for Depth Image Based Rendering," Fraunhofer Institute for Telecommunications Heinrich Hertz Institute, Berlin, Germany (2012).
Waizenegger et al., "Calibration of a Synchronized Multi-Camera Setup for 3D Videoconferencing," Fraunhofer Institute for Telecommunications, Berlin, Germany (2010).
Tanimoto, "Free-Viewpoint Television," Image and Geometry Processing for 3-D Cinematography, Geometry and Computing 5, pp. 53-76, Springer-Verlag, Berlin, Germany (2010).
Tanimoto et al., "Free-Viewpoint TV; A review of the ultimate 3DTV and its related technologies," IEEE Signal Processing Magazine, pp. 67-76, Institute of Electrical and Electronics Engineers, Valbonne, France (Jan. 2011).
Wilburn et al., "High Performance Imaging Using Large Camera Arrays," (2005).
Zitnick et al., "High-quality video view interpolation using a layered representation," (2004).
Matusik et al., "Image-Based Visual Hulls," (2000).
Dumont et al., "Immersive Teleconferencing with Natural 3D Stereoscopic Eye Contact Using GPU Computing," (2010).
Levoy et al., "Light Field Rendering," SIGGRAPH, pp. 1-12 (1996).
Schirmacher et al., "On-the-Fly Processing of Generalized Lumigraphs," Eurographics, vol. 20, Issue 3, Blackwell Publishers, Oxford, United Kingdom (2001).
Feldmann et al., "Real-Time Depth Estimation for Immersive 3D Videoconferencing," Institute of Electrical and Electronics Engineers, Valbonne, France (2010).
Riechert et al., "Real-Time Disparity Estimation Using Line-Wise Hybrid Recursive Matching and Cross-Bilateral Median Up-Sampling," $21^{st}$ International Conference on Pattern Recognition, Tsukuba, Japan, pp. 3168-3171 (2012).
Naemura et al., "Real-Time Video-Based Modeling and Rendering of 3D Scenes," IEEE Computer Graphics and Applications, pp. 66-73, Institute of Electrical and Electronics Engineers (2002).
Kanade et al., "The 3D Room: Digitizing Time-Varying 3D Events by Synchronized Multiple Video Streams," The Robotics Institute, Carnegie Mellon University, Pittsburgh, Pennsylvania (Dec. 28, 1998).
Wilburn et al., "The Light Field Video Camera," (2002).
Schreer et al., "User-Feedback and Optimization for Multi-View Calibration," Fraunhofer Institute for Telecommunications, Berlin, Germany (2013).
Tola et al., "Virtual View Generation with a Hybrid Camera Array," pp. 1-20 (2009).
Kanade et al., "Virtualized Reality: Concepts and Early Results," pp. 69-76, Institute of Electrical and Electronics Engineers, Valbonne, France (1995).

\* cited by examiner

Broad-narrow baseline combined system formed of a single camera and a trifocal camera

IMAGE REGISTRATION METHOD AND APPARATUS

CROSS-REFERENCE TO RELATED APPLICATIONS

This application claims priority to Chinese Patent Application No. 201510012012.0, filed with the Chinese Patent Office on Jan. 9, 2015, which is incorporated herein by reference in its entirety.

TECHNICAL FIELD

The present disclosure relates to the field of image processing, and in particular, to an image registration method and apparatus.

BACKGROUND

Virtual view rendering is an important means of converting a 2D image into a 3D image. Virtual view rendering includes steps of image collection, image registration, depth map estimation, virtual view generation, and the like in a scene. Before virtual view rendering is performed, an image in the scene needs to be collected, and there are multiple manners of collecting the image in the scene, in which a manner of collecting the image in the scene by using a camera array is widely used.

In the prior art, a large quantity of manners of arranging a camera array, for example, a high-density camera array, a sparse camera array, a distributed light field camera array, a planar camera array, and the like, are proposed, where the planar camera array is an effective manner of collecting the image in the scene.

However, in practice, due to errors in locations at which cameras are placed, accurate alignment is usually very difficult for a planar camera array. After horizontally or vertically adjacent cameras that are unaligned are used to collect images, corresponding pixels of the collected images are not necessarily located in a horizontal or vertical direction, and a search scope of corresponding pixels needs to be expanded, resulting in high complexity of an algorithm for image registration, which adversely affects subsequent real-time rendering of a virtual viewpoint.

SUMMARY

Embodiments of the present disclosure provide an image registration method and apparatus, so that cameras in a planar camera array can be accurately aligned, thereby reducing complexity of image registration.

According to a first aspect, an image registration method is provided, where the method includes: determining a target plane according to a locations of an optical center of each of cameras in a planar camera array; orthogonally projecting the optical center of each of the cameras in the planar camera array onto the target plane, to obtain a projected point of the optical center of each of the cameras; generating a rectangular grid on the target plane according to the projected points of the optical centers of the cameras in the planar camera array, where a quantity of rows of the rectangular grid is the same as a quantity of rows of the planar camera array, and a quantity of columns of the rectangular grid is the same as a quantity of columns of the planar camera array; obtaining a target grid point of each of the cameras according to the rectangular grid, where the target grid point of each of the cameras is a grid point that is among grid points of the rectangular grid and is nearest to the projected point of the optical center of each of the cameras; determining a target camera coordinate system of each of the cameras by using the target grid point of each of the cameras as an origin; and registering, according to spatial location relationships between the cameras in the planar camera array and the target camera coordinate systems, images collected by the cameras in the planar camera array.

With reference to the first aspect, in an implementation manner of the first aspect, the target plane is a plane that is in three-dimensional space and has a minimum mean value of distances from the optical centers of the cameras in the planar camera array.

With reference to the first aspect, in another implementation manner of the first aspect, the determining a target plane according to a location of an optical center of each of cameras in a planar camera array includes: acquiring current camera coordinate systems of the cameras in the planar camera array; determining a target z axis according to z axes of the current camera coordinate systems of the cameras, where a direction of the target z axis is a mean direction of the z axes of the current camera coordinate systems of the cameras in the planar camera array; and determining, by using the direction of the target z axis as a normal direction of the target plane, the target plane that is in three-dimensional space and has a minimum mean value of distances from the optical centers of the cameras in the planar camera array.

With reference to the first aspect or either of the foregoing implementation manners of the first aspect, in another implementation manner of the first aspect, the rectangular grid meets that a sum of squares of distances between the projected points of the optical centers of the cameras in all the cameras and the target grid points of the cameras is minimal.

With reference to the first aspect or any one of the foregoing implementation manners of the first aspect, in another implementation manner of the first aspect, a z axis of the target camera coordinate system of each of the cameras is the same as the normal direction of the target plane, an x axis of the target camera coordinate system of each of the cameras is the same as a direction of a first grid line in the rectangular grid, a y axis of the target camera coordinate system of each of the cameras is the same as a direction of a second grid line in the rectangular grid, and the first grid line and the second grid line are perpendicular to each other.

With reference to the first aspect or any one of the foregoing implementation manners of the first aspect, in another implementation manner of the first aspect, the determining a target camera coordinate system of each of the cameras by using the target grid point of each of the cameras as an origin includes: determining a target x axis, a target y axis, and the target z axis according to x axes, y axes, and the z axes of the current camera coordinate systems of all the cameras in the planar camera array, where a direction of the target x axis is a mean direction of the x axes of the current camera coordinate systems of all the cameras, a direction of the target y axis is a mean direction of the y axes of the current camera coordinate systems of all the cameras, and a direction of the target z axis is a mean direction of the z axes of the current camera coordinate systems of all the cameras; and determining a target camera coordinate system of each of the cameras by using a grid point in the rectangular grid that is nearest to the projected point of the optical center of each of the cameras as an origin, where a z axis of the target camera coordinate system of each of the cameras is the target z axis or a z axis that is among the z axes of the current camera coordinate systems of all the cameras and has a minimum angle deviation from the target z axis, an x axis of the target coordinate system of each of the cameras is the target x axis or an x axis that is among x axes of the current camera coordinate systems of all the cameras and has a minimum angle deviation from the target x axis, and a y axis of the target coordinate system of each of the cameras is the target y axis or a y axis that is among y axes of the current camera coordinate systems of all the cameras and has a minimum angle deviation from the target y axis.

With reference to the first aspect or any one of the foregoing implementation manners of the first aspect, in another implementation manner of the first aspect, the registering, according to spatial location relationships between the current camera coordinate systems and the target camera coordinate systems in the cameras in the planar camera array, images collected by the cameras in the planar camera array includes: performing, according to a spatial location relationship between the current camera coordinate system and the target camera coordinate system of each of the cameras in the planar camera array, coordinate conversion on an image collected in the current camera coordinate system by each of the cameras, to obtain an image collected in the target camera coordinate system by each of the cameras; and registering images collected in respective target camera coordinate systems by adjacent cameras in the planar camera array.

According to a second aspect, an image registration apparatus is provided, where the apparatus includes: a first determining unit, configured to determine a target plane according to a location of an optical center of each of cameras in a planar camera array; a projecting unit, configured to orthogonally project the optical center of each of the cameras in the planar camera array onto the target plane determined by the first determining unit, to obtain a projected point of the optical center of each of the cameras; a generating unit, configured to generate a rectangular grid on the target plane according to the projected points of the optical centers of the cameras in the planar camera array that are obtained by the projecting unit, where a quantity of rows of the rectangular grid is the same as a quantity of rows of the planar camera array, and a quantity of columns of the rectangular grid is the same as a quantity of columns of the planar camera array; a second determining unit, configured to obtain a target grid point of each of the cameras according to the rectangular grid generated by the generating unit, where the target grid point of each of the cameras is a grid point that is among grid points of the rectangular grid and is nearest to the projected point of the optical center of each of the cameras; a third determining unit, configured to determine a target camera coordinate system of each of the cameras by using the target grid point of each of the cameras that is determined by the second determining unit as an origin; and a registering unit, configured to register, according to spatial location relationships between the cameras in the planar camera array and the target camera coordinate systems determined by the third determining unit, images collected by the cameras in the planar camera array.

With reference to the second aspect, in an implementation manner of the second aspect, the target plane is a plane that is in three-dimensional space and has a minimum mean value of distances from the optical centers of the cameras in the planar camera array.

With reference to the second aspect, in another implementation manner of the second aspect, the first determining unit is specifically configured to acquire current camera coordinate systems of the cameras in the planar camera array; determine a target z axis according to z axes of the current camera coordinate systems of the cameras, where a direction of the target z axis is a mean direction of the z axes of the current camera coordinate systems of the cameras in the planar camera array; and determine, by using the direction of the target z axis as a normal direction of the target plane, the target plane that is in three-dimensional space and has a minimum mean value of distances from the optical centers of the cameras in the planar camera array.

With reference to the second aspect or either of the foregoing implementation manners of the second aspect, in another implementation manner of the second aspect, the rectangular grid meets that a sum of squares of distances between the projected points of the optical centers of the cameras in all the cameras and the target grid points of the cameras is minimal.

With reference to the second aspect or any one of the foregoing implementation manners of the second aspect, in another implementation manner of the second aspect, a z axis of the target camera coordinate system of each of the cameras is the same as the normal direction of the target plane, an x axis of the target camera coordinate system of each of the cameras is the same as a direction of a first grid line in the rectangular grid, a y axis of the target camera coordinate system of each of the cameras is the same as a direction of a second grid line in the rectangular grid, and the first grid line and the second grid line are perpendicular to each other.

With reference to the second aspect or any one of the foregoing implementation manners of the second aspect, in another implementation manner of the second aspect, the third determining unit is specifically configured to determine a target x axis, a target y axis, and the target z axis according to x axes, y axes, and the z axes of the current camera coordinate systems of all the cameras in the planar camera array, where a direction of the target x axis is a mean direction of the x axes of the current camera coordinate systems of all the cameras, a direction of the target y axis is a mean direction of the y axes of the current camera coordinate systems of all the cameras, and a direction of the target z axis is a mean direction of the z axes of the current camera coordinate systems of all the cameras; and determine a target camera coordinate system of each of the cameras by using a grid point in the rectangular grid that is nearest to the projected point of the optical center of each of the cameras as an origin, where a z axis of the target camera coordinate system of each of the cameras is the target z axis or a z axis that is among the z axes of the current camera coordinate systems of all the cameras and has a minimum angle deviation from the target z axis, an x axis of the target coordinate system of each of the cameras is the target x axis or an x axis that is among x axes of the current camera coordinate systems of all the cameras and has a minimum angle deviation from the target x axis, and a y axis of the target coordinate system of each of the cameras is the target y axis or a y axis that is among y axes of the current camera coordinate systems of all the cameras and has a minimum angle deviation from the target y axis.

With reference to the second aspect or any one of the foregoing implementation manners of the second aspect, in another implementation manner of the second aspect, the registering unit is specifically configured to perform, according to a spatial location relationship between the current camera coordinate system and the target camera coordinate system of each of the cameras in the planar camera array, coordinate conversion on an image collected in the current camera coordinate system by each of the cameras, to obtain an image collected in the target camera coordinate system by each of the cameras; and register images collected in respective target camera coordinate systems by adjacent cameras in the planar camera array.

In the embodiments of the present disclosure, a target plane and a rectangular grid on the target plane are determined first, and a grid point of the rectangular grid is used as an origin to re-establish a target camera coordinate system of a camera. Because target camera coordinate systems of cameras in a planar camera array are located on a same plane and are accurately aligned with each other, the accurately aligned camera coordinate systems can greatly reduce complexity of an algorithm for subsequent image registration, thereby implementing real-time rendering of a virtual viewpoint.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Specific application of a planar camera array is briefly described below with reference to FIG. 1.

Figure 1:
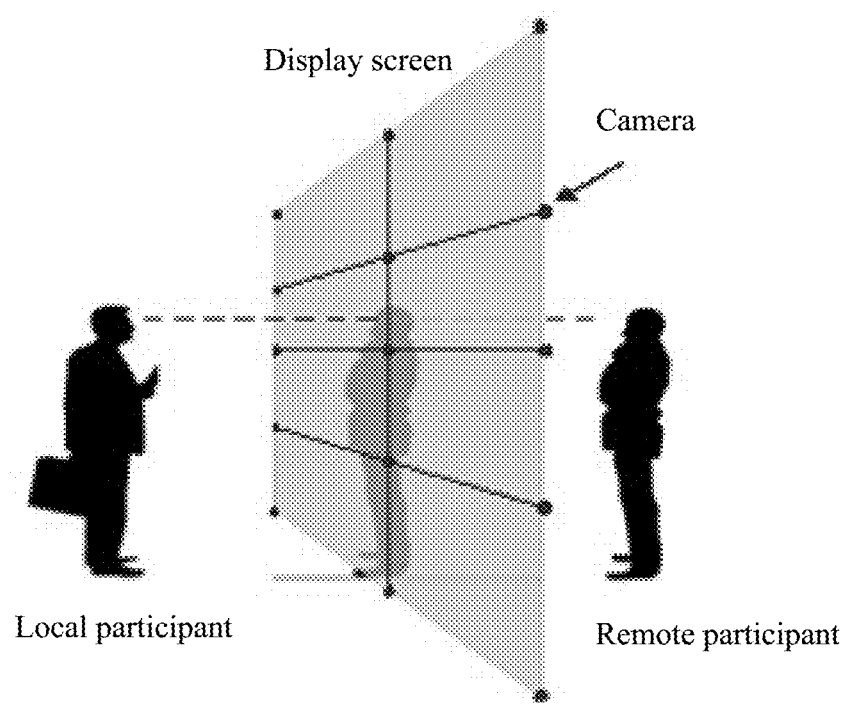
FIG. 1 is a schematic diagram of a scene of a remote video conference.

FIG. 1 is a schematic diagram of a scene of a virtual video conference. In FIG. 1, a planar camera array is integrated into a large display screen, a camera array is used to perform collection on a scene in which a remote participant in front of a screen is, virtual view rendering is performed on a result of image collection, and a result of rendering is presented on a screen in front of a local participant. Because a location of a virtual viewpoint can be flexibly selected in virtual view rendering, a virtual eye-to-eye effect can be formed according to positions of the eyes of the local participant.

If the cameras in the planar camera array can be accurately aligned, that is, are accurately located on a same plane, complexity of an algorithm for subsequent image registration, depth map estimation, and virtual view rendering is greatly simplified. Specifically, assuming that the planar camera array is accurately aligned, during image registration, corresponding points in images collected by horizontally adjacent cameras in the camera array are certainly located in a horizontal direction, and corresponding points in images collected by vertically adjacent cameras in the camera array are certainly located in a vertical direction. In this way, during image registration, a search only needs to be made in a one-dimensional direction (horizontally or vertically) to rapidly find corresponding points, thereby greatly improving efficiency of searching for corresponding points. In addition, information such as a parallax and a depth that is obtained based on corresponding points may also be briefly represented in a unified manner, that is, represented by a unified equation $d=x-x'=Bf/Z$, where d represents a parallax, x and x' represent a pair of corresponding points, B represents a baseline width (fixed value) between adjacent cameras, and Z represents a depth. When subsequent depth map estimation and virtual view generation are performed based on the unified representation, algorithm complexity can be greatly reduced.

An image registration method according to an embodiment of the present disclosure is described in detail below with reference to FIG. 2.

Figure 2:
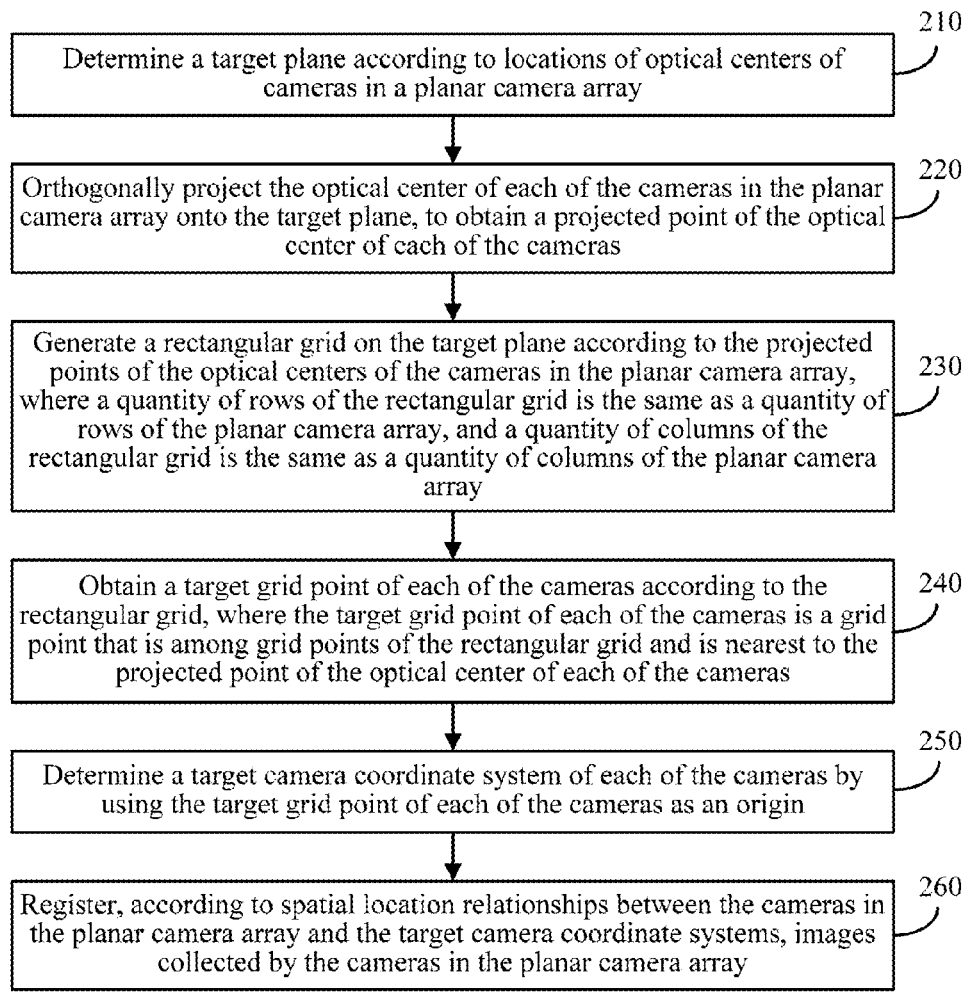
FIG. 2 is a schematic flowchart of an image registration method according to an embodiment of the present disclosure.

FIG. 2 is a schematic flowchart of an image registration method according to an embodiment of the present disclosure. The method in FIG. 2 includes:

210: Determine a target plane according to a location of an optical center of each of cameras in a planar camera array.

An optical center is an important parameter of a camera. The optical center of the camera is located at an origin of a camera coordinate system of the camera. After a location of the camera is fixed, a location of the optical center of the camera is also fixed, and the location of the optical center of the camera may be obtained by acquiring intrinsic parameters of the camera.

Figure 3:
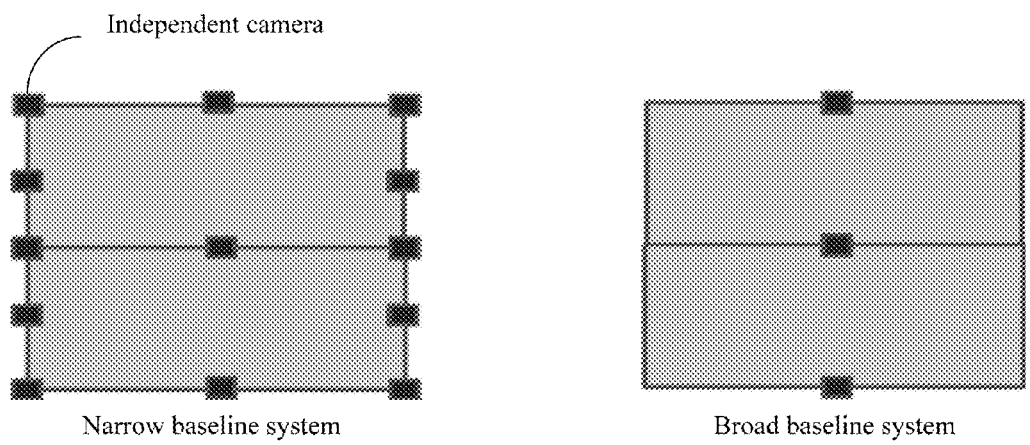
FIG. 3 is an exemplary diagram of a distribution manner of a planar camera array.
Figure 4:
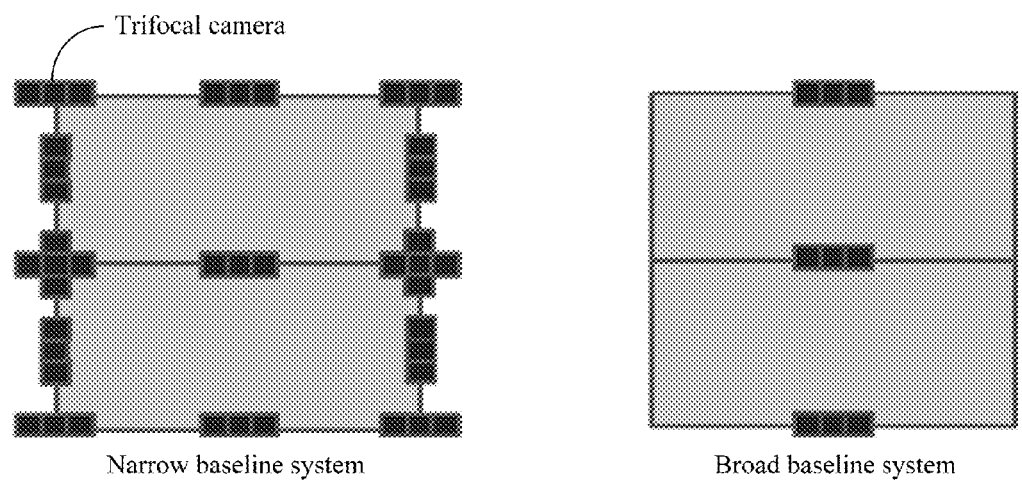
FIG. 4 is an exemplary diagram of a distribution manner of a planar camera array.
Figure 5:
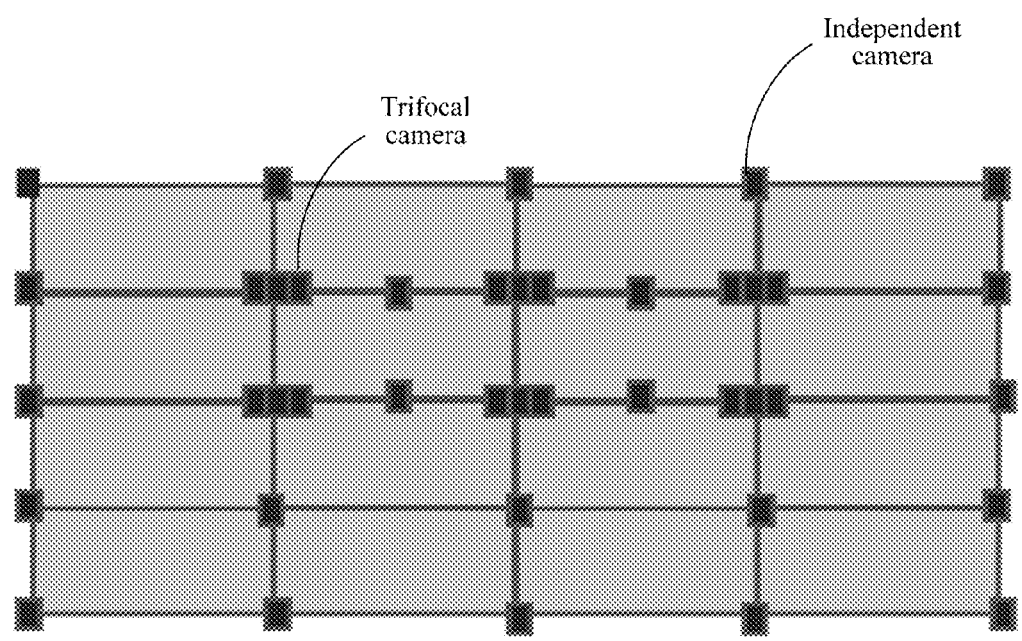
FIG. 5 is an exemplary diagram of a distribution manner of a planar camera array.

It should be noted that the planar camera array in this embodiment of the present disclosure may be a broad baseline system, a narrow baseline system, or a broad-narrow baseline combined system. In addition, each of the cameras in the planar camera array may be a single camera, or may be a trifocal camera, or the planar camera array is a combined system including a single camera and a trifocal camera. For example, in FIG. 3, the cameras in the planar camera array are all independent cameras, a narrow baseline system including independent cameras is provided on the left side of FIG. 3, and a broad baseline system including independent cameras is provided on the right side of FIG. 3. In FIG. 4, the cameras in the planar camera array are trifocal cameras, a narrow baseline system including trifocal cameras is provided on the left side of FIG. 4, and a broad baseline system including trifocal cameras is provided on the right side of FIG. 4. FIG. 5 is a broad-narrow baseline combined system including an independent camera and a trifocal camera.

There are multiple implementation manners of step 210. For example, a plane that has shortest distances from all optical centers or a shortest mean distance of the distances from all the optical centers is found by using an optimization algorithm and is used as a target plane. Alternatively, a normal direction of a plane is first specified, and a plane that has shortest distances from all the optical centers or a shortest mean distance of the distances from all the optical centers is then obtained by means of a search along the normal direction and is used as a target plane. Alternatively, three optical centers are found from all the optical centers, and the three optical centers are then used to determine one target plane. It should be noted that there are multiple manners of determining the target plane, which is not specifically limited in this embodiment of the present disclosure, and is subsequently described in detail with reference to a specific embodiment.

220: Orthogonally project the optical center of each of the cameras in the planar camera array onto the target plane, to obtain a projected point of the optical center of each of the cameras.

It should be noted that the orthogonal projection refers to that a projected line from the optical center of the camera to the target plane is perpendicular to the target plane, and an intersecting point of the projected line and the target plane is the projected point of the camera.

230: Generate a rectangular grid on the target plane according to the projected points of the optical centers of the cameras in the planar camera array, where a quantity of rows of the rectangular grid is the same as a quantity of rows of the planar camera array, and a quantity of columns of the rectangular grid is the same as a quantity of columns of the planar camera array.

The rectangular grid includes grid lines that perpendicularly intersect on the target plane. Assuming that the planar camera array includes M rows and N columns, the rectangular grid also includes M rows and N columns.

There may be multiple implementation manners of step 230. For example, the rectangular grid has many intersecting grid points. When the location of the rectangular grid is determined, a projected point of an optical center of one camera is certainly nearest to one grid point of the rectangular grid, and the grid point may be referred to as a target grid point of the camera. Then, the rectangular grid is calculated by using an optimization model. For example, an optimization target of the optimization model may be set as that a sum of squares of distances between projected points of optical centers of all cameras and respective target grid points is minimal. A constraint is defined as that a quantity of rows of the rectangular grid is the same as a quantity of rows of the planar camera array, and a quantity of columns of the rectangular grid is the same as a quantity of columns of the planar camera array. Then, the rectangular grid is calculated by using an algorithm such as a Newton's steepest descent method and a gradient ascent method. Specifically, assuming that the planar camera array has four cameras, distances between optical centers of projected points of the four cameras and respective target grid points are a, b, c, and d, respectively, and the optimization target may be defined as that $(a^2+b^2+c^2+d^2)$ is minimal.

For another example, the optimization model may be defined as that the rectangular grid passes through a largest quantity of projected points of optical centers of the cameras in the planar camera array. The constraint is defined as that a quantity of rows of the rectangular grid is the same as a quantity of rows of the planar camera array, and a quantity of columns of the rectangular grid is the same as a quantity of columns of the planar camera array. Then, the rectangular grid is calculated by using an algorithm such as a Newton's steepest descent method and a gradient ascent method. It should be noted that there are multiple manners of determining the rectangular grid, which is not specifically limited in this embodiment of the present disclosure, and is subsequently described in detail with reference to a specific embodiment.

Figure 6:
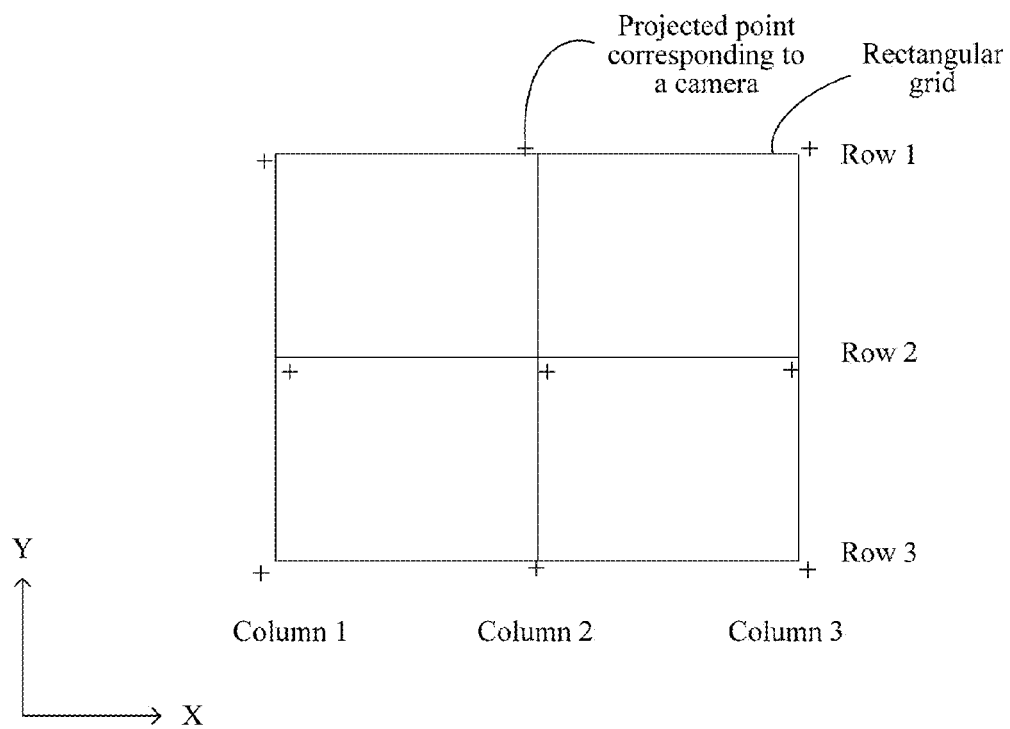
FIG. 6 is a schematic diagram of a rectangular grid.

For another example, assuming that the planar camera array is a 3×3 array, and locations of projected points of the 3×3 array on a target plane are shown by "+" in FIG. 6. One two-dimensional coordinate system (the two-dimensional coordinate system should be parallel, as much as possible, to two sides of an approximate rectangle including the nine projected points in the figure) is established on the target plane. Then, mean values of y coordinates of projected points in row 1, row 2, and row 3 are calculated, to obtain three lines parallel to an x axis. Similarly, mean values of x coordinates of the projected points in column 1, column 2, and column 3 are calculated, to obtain three lines parallel to a y axis, and the three lines parallel to the x axis and the three lines parallel to the y axis intersect to form the rectangular grid in FIG. 6.

240: Obtain a target grid point of each of the cameras according to the rectangular grid, where the target grid point of each of the cameras is a grid point that is among grid points of the rectangular grid and is nearest to the projected point of the optical center of each of the cameras.

250: Determine a target camera coordinate system of each of the cameras by using the target grid point of each of the cameras as an origin.

It should be noted that the grid point of the rectangular grid refers to an intersecting point of a row and a column of the rectangular grid.

Specifically, after the rectangular grid is obtained by using step 250, a distance between the projected point corresponding to each of the cameras and the grid point of the rectangular grid may be calculated, to find a nearest grid point; or, it may be first determined in which grid of the rectangular grid the projected point of the optical center of each of the cameras falls, and then, distances from only four angular points of a grid including the projected point are calculated, to find a nearest grid point.

It should be noted that the target camera coordinate system is relative to the current camera coordinate system of the camera, and it may be understood in this way: currently the cameras in the planar array are located at respective current camera coordinate systems. In this embodiment of the present disclosure, target camera coordinate systems of the cameras are to be determined again by using operations such as calculation of a target plane and division of a rectangular grid, thereby implementing alignment of the cameras.

It should be further noted that the grid point nearest to the projected point of the optical center of each of the cameras is the origin of the target camera coordinate system of the camera. In this embodiment of the present disclosure, directions of an x axis, a y axis, and a z axis of the target camera coordinate system of the camera are not specifically limited. For example, a mean direction of the x axes, a mean direction of the y axes, and a mean direction of the z axes that are of all the cameras in the planar camera array may be calculated. The obtained mean direction of the x axes is used as the direction of the x axis of the target camera coordinate system, the obtained mean direction of the y axes is used as the direction of the y axis of the target camera coordinate system, and the obtained mean direction of the z axes is used as the direction of the z axis of the target camera coordinate system. For another example, a normal direction of a target plane may be used as a z axis of a target camera coordinate system of each of the cameras, and intersecting grid lines are used as an x axis and a y axis of the target camera coordinate system. It should be noted that there are multiple manners of determining a direction of a target camera coordinate system, which is not specifically limited in this embodiment of the present disclosure, and is subsequently described in detail with reference to a specific embodiment.

260: Register, according to spatial location relationships between the cameras in the planar camera array and the target camera coordinate systems, images collected by the cameras in the planar camera array.

Specifically, step 260 may include: performing, according to a spatial location relationship between the current camera coordinate system and the target camera coordinate system of each of the cameras in the planar camera array, coordinate conversion on an image collected in the current camera coordinate system by each of the cameras, to obtain an image collected in the target camera coordinate system by each of the cameras; and registering images collected in respective target camera coordinate systems by adjacent cameras in the planar camera array.

It should be noted that in this embodiment of the present disclosure, a camera in the planar camera array is not moved; instead, a homography matrix between a current camera coordinate system and a target camera coordinate system of the camera is recorded (the homography matrix is used to indicate a spatial location relationship between the current camera coordinate system and the target camera coordinate system). When a camera in the planar camera array is used to collect an image, the homography matrix corresponding to each of the cameras is used to perform conversion on pixels in the collected image. The image obtained after the conversion is consistent with the image collected in the target camera coordinate system by the camera. Because the target camera coordinate systems of the cameras in the planar camera array are perfectly aligned, after images collected by horizontally or vertically adjacent cameras are converted, a search may be made along a horizontal or vertical direction to find pixels corresponding to the images, thereby greatly reducing complexity of image registration.

Optionally, a tolerance range between a current location and a target location of each of the cameras, for example, a threshold of a distance between origins of a current camera coordinate system and a target camera coordinate system, or a threshold of a deflection angle of a coordinate axis, may be set. When a location relationship between a target camera coordinate system and a current camera coordinate system of a camera exceeds the tolerance range, the current camera coordinate system of the camera is manually adjusted. When the location relationship does not exceed the tolerance range, a homography matrix between the current camera coordinate system and the target camera coordinate system is recorded, which is equivalent to that the target camera coordinate system is used as a virtual camera location of the camera.

In this embodiment of the present disclosure, a target plane and a rectangular grid on the target plane are determined first, and a grid point of the rectangular grid is used as an origin to re-establish a target camera coordinate system of a camera. Because target camera coordinate systems of cameras in a planar camera array are located on a same plane and are accurately aligned with each other, the accurately aligned camera coordinate systems can greatly reduce complexity of an algorithm for subsequent image registration, thereby implementing real-time rendering of a virtual viewpoint.

A manner of determining a target plane in step 210 is described below in detail with reference to a specific embodiment.

Optionally, as an embodiment, the target plane is a plane that is in three-dimensional space and has a minimum mean value of distances from the optical centers of the cameras in the planar camera array.

Figure 7:
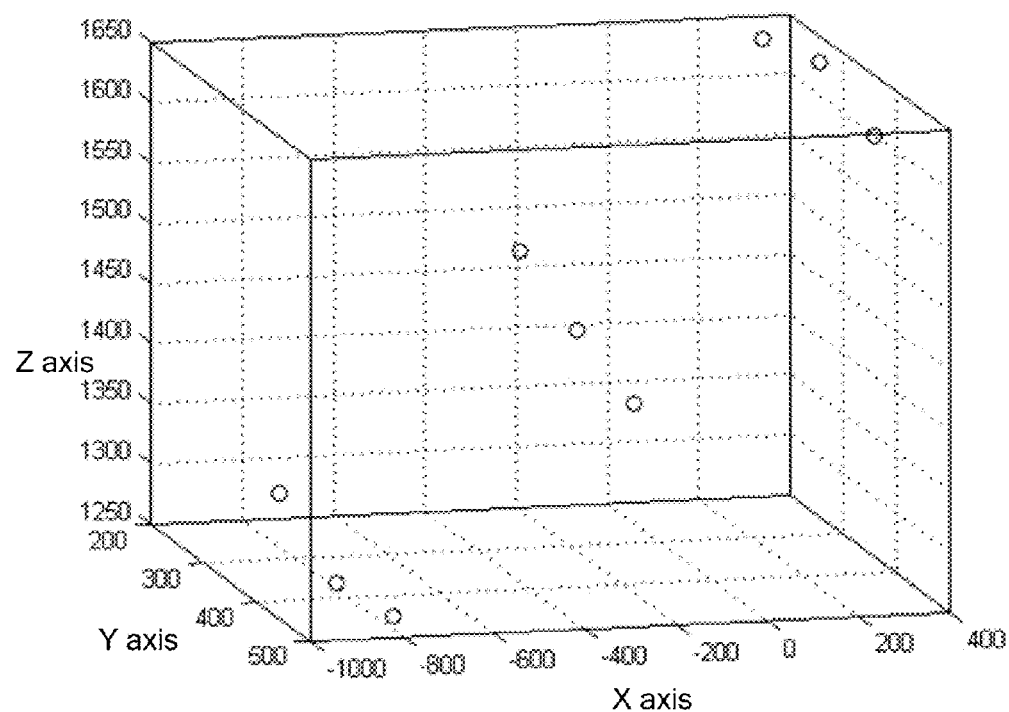
FIG. 7 is a schematic diagram of coordinates of optical centers of cameras in a planar camera array.
Figure 8:
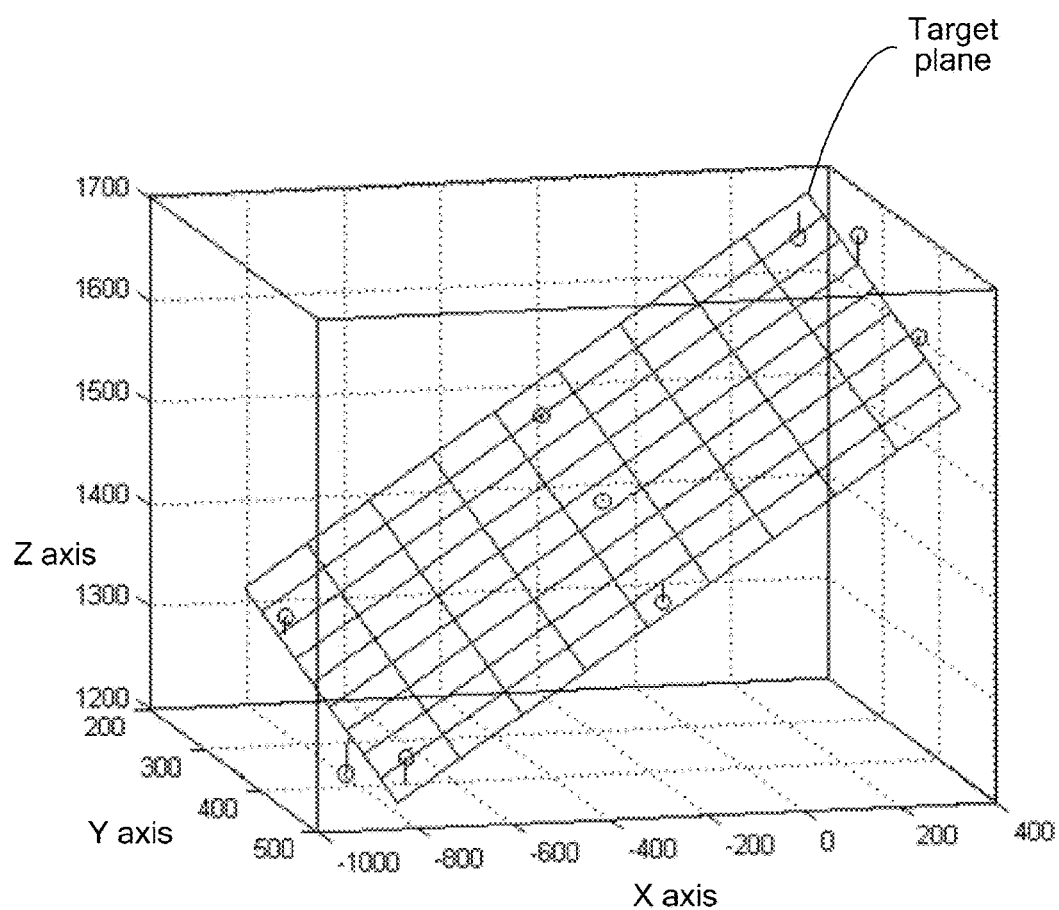
FIG. 8 is a schematic diagram of a target plane.

Specifically, to determine a target plane, one three-dimensional coordinate system may be pre-established. An origin and coordinate axes of the three-dimensional coordinate system may be randomly chosen. For example, a current camera coordinate system of a camera in the planar camera array may be used as the three-dimensional coordinate system. By using a 3×3 planar camera array as an example, a coordinate system shown in FIG. 7 may be established, and locations of optical centers of cameras in the planar camera array in the coordinate system are determined, to obtain coordinate points of nine optical centers shown in FIG. 7. Then, a target plane is calculated, so that the distances of the coordinate points of the nine optical centers from the target plane are minimal or a mean value of the distances is minimal, to obtain the target plane shown in FIG. 8 (it should be noted that in FIG. 8, the intersecting grid lines on the plane are not the rectangular grid in this embodiment of the present disclosure, but are merely auxiliary lines introduced to better show the target plane). As can be seen from the connecting lines between the points and the plane in FIG. 7, some points fall above the target plane, some points fall below the target plane, and some points fall right on the target plane. The calculation of the target plane may be concluded into one optimization problem, in which the optimization target is that the distances from the target plane to the optical centers of the cameras of the planar camera array are minimal or the mean distance of the distances is minimal, parameters (for example, A, B, C, and D in $Ax+By+Cz+D=0$) of the target plane are used as optimization variables, and an optimization algorithm such as a Newton's steepest descent method and a gradient ascent method is used to calculate the target plane.

Optionally, as another embodiment, step 210 may include: acquiring current camera coordinate systems of the cameras in the planar camera array; determining a target z axis according to z axes of the current camera coordinate systems of the cameras in the planar camera array, where a direction of the target z axis is a mean direction of the z axes of the current camera coordinate systems of the cameras in the planar camera array; and determining, by using the direction of the target z axis as a normal direction of the target plane, the target plane that is in three-dimensional space and has a minimum mean value of distances from the optical centers of the cameras in the planar camera array.

The direction of the target z axis being the mean direction of the z axes of the current coordinate systems of the cameras in the planar camera array specifically refers to: a value of a vector of the direction of the target z axis is a mean value of vectors of directions of the z axes of the current coordinate systems of the cameras in the planar camera array.

For example, the z axis of the direction of the current camera coordinate system of each of the cameras in the planar camera array may be represented by one vector in space. Assuming that a planar camera array is a 3×3 camera array, the direction of the z axis of the current camera coordinate system of each of the cameras is represented by one vector, to obtain nine vectors, and the nine vectors may be added up and a mean of the nine vectors is calculated, to obtain a final direction of the target z axis. Then, an optimization manner may be used to determine the target plane, so that the distances from the target plane to the optical centers of the nine cameras are minimal or a mean value of the distances is minimal. A difference between this embodiment and the previous embodiment lies in that in this embodiment, a normal direction of a target plane is first determined, and the target plane is then determined through optimization, while in the previous embodiment, all parameters of a target plane are obtained through optimization.

A manner of determining a target plane and then acquiring a rectangular grid on the target plane is described below in detail with reference to a specific embodiment.

Optionally, as an embodiment, the rectangular grid meets that a sum of squares of distances between the projected points of the optical centers of the cameras in all the cameras and the target grid points of the cameras is minimal.

For example, assuming that the planar camera array includes nine cameras, for the nine cameras, there are nine projected points on the target plane. For each of the projected points, one point nearest to the projected point is found among grid points of the rectangular grid, to obtain nine target grid points. A distance exists between each of the projected points and the corresponding target grid point, and there are in total nine distance values. The rectangular grid is calculated by using the optimization target that a sum of squares of the nine distance values is minimal, and a specific division form of the rectangular grid may be obtained.

A manner of determining the target coordinate system of each of the cameras in the planar camera array is described below in detail with reference to a specific embodiment.

Optionally, as an embodiment, a z axis of the target camera coordinate system of each of the cameras is the same as the normal direction of the target plane, an x axis of the target camera coordinate system of each of the cameras is the same as a direction of a first grid line in the rectangular grid, a y axis of the target camera coordinate system of each of the cameras is the same as a direction of a second grid line in the rectangular grid, and the first grid line and the second grid line are perpendicular to each other.

Optionally, as an embodiment, step 240 may include: determining a target x axis, a target y axis, and the target z axis according to x axes, y axes, and the z axes of the current camera coordinate systems of all the cameras in the planar camera array, where a direction of the target x axis is a mean direction of the x axes of the current camera coordinate systems of all the cameras, a direction of the target y axis is a mean direction of the y axes of the current camera coordinate systems of all the cameras, and a direction of the target z axis is a mean direction of the z axes of the current camera coordinate systems of all the cameras; and determine a target camera coordinate system of each of the cameras by using a grid point in the rectangular grid that is nearest to the projected point of the optical center of each camera distance as an origin, where a z axis of the target camera coordinate system of each of the cameras is the target z axis or a z axis that is among the z axes of the current camera coordinate systems of all the cameras and has a minimum angle deviation from the target z axis, an x axis of the target coordinate system of each of the cameras is the target x axis or an x axis that is among x axes of the current camera coordinate systems of all the cameras and has a minimum angle deviation from the target x axis, and a y axis of the target coordinate system of each of the cameras is the target y axis or a y axis that is among y axes of the current camera coordinate systems of all the cameras and has a minimum angle deviation from the target y axis.

It should be noted that the direction of the target x axis being the mean direction of the x axes of the current coordinate systems of all the cameras specifically refers to that: a value of a vector of the direction of the target x axis is a mean value of vectors of directions of the x axes of the current coordinate systems of all the cameras. The case is similar for the direction of the target y axis and the direction of the target z axis.

The image registration method according to the embodiments of the present disclosure is described above in detail with reference to FIG. 1 to FIG. 8, and an image registration apparatus according to an embodiment of the present disclosure is described below in detail with reference to FIG. 9 and FIG. 10. It should be noted that the image registration apparatus described in FIG. 9 and FIG. 10 can implement the steps in FIG. 2, which are not described herein again to avoid repetition.

Figure 9:
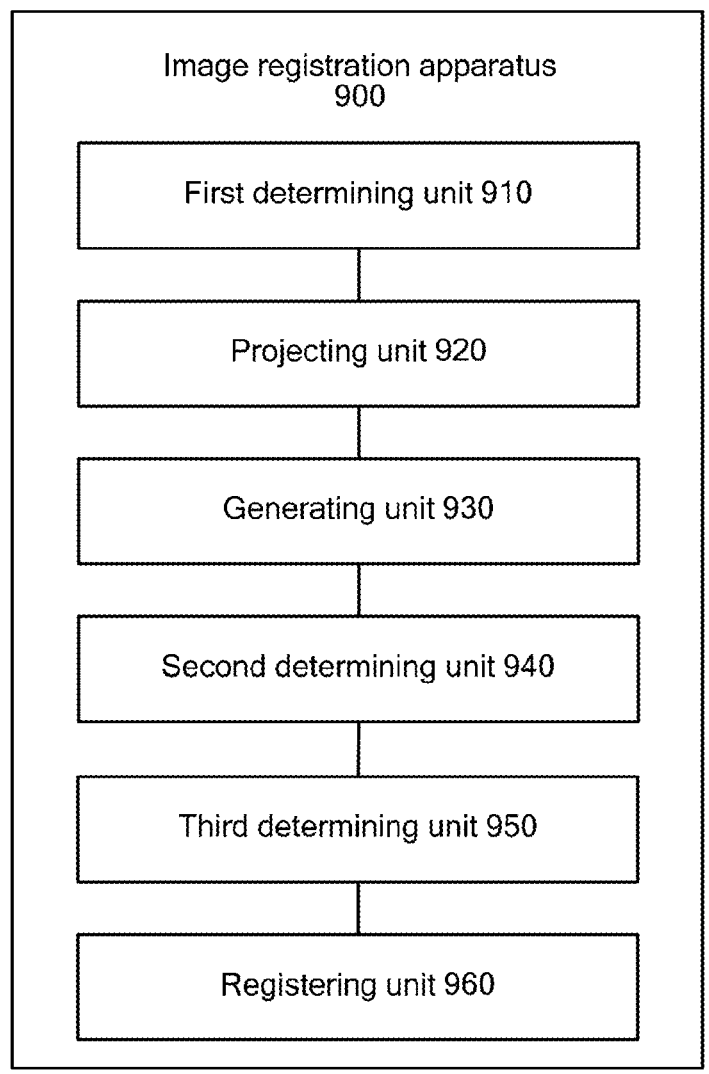
FIG. 9 is a schematic block diagram of an image registration apparatus according to an embodiment of the present disclosure.

FIG. 9 is a schematic block diagram of an image registration apparatus according to an embodiment of the present disclosure. The image registration apparatus 900 in FIG. 9 includes:

a first determining unit 910, configured to determine a target plane according to a location of an optical center of each of cameras in a planar camera array;

a projecting unit 920, configured to orthogonally project the optical center of each of the cameras in the planar camera array onto the target plane determined by the first determining unit 910, to obtain a projected point of the optical center of each of the cameras;

a generating unit 930, configured to generate a rectangular grid on the target plane according to the projected points of the optical centers of the cameras in the planar camera array that are obtained by the projecting unit 920, where a quantity of rows of the rectangular grid is the same as a quantity of rows of the planar camera array, and a quantity of columns of the rectangular grid is the same as a quantity of columns of the planar camera array;

a second determining unit 940, configured to obtain a target grid point of each of the cameras according to the rectangular grid generated by the generating unit 930, where the target grid point of each of the cameras is a grid point that is among grid points of the rectangular grid and is nearest to the projected point of the optical center of each of the cameras;

a third determining unit 950, configured to determine a target camera coordinate system of each of the cameras by using the target grid point of each of the cameras that is determined by the second determining unit 940 as an origin; and a registering unit 960, configured to register, according to spatial location relationships between the cameras in the planar camera array and the target camera coordinate systems determined by the third determining unit 950, images collected by the cameras in the planar camera array.

In this embodiment of the present disclosure, a target plane and a rectangular grid on the target plane are determined first, and a grid point of the rectangular grid is used as an origin to re-establish a target camera coordinate system of a camera. Because target camera coordinate systems of cameras in a planar camera array are located on a same plane and are accurately aligned with each other, the accurately aligned camera coordinate systems can greatly reduce complexity of an algorithm for subsequent image registration, thereby implementing real-time rendering of a virtual viewpoint.

Optionally, as an embodiment, the target plane is a plane that is in three-dimensional space and has a minimum mean value of distances from the optical centers of the cameras in the planar camera array.

Optionally, as an embodiment, the first determining unit 910 is specifically configured to acquire current camera coordinate systems of the cameras in the planar camera array; determine a target z axis according to z axes of the current camera coordinate systems of the cameras, where a direction of the target z axis is a mean direction of the z axes of the current camera coordinate systems of the cameras in the planar camera array; and determine, by using the direction of the target z axis as a normal direction of the target plane, the target plane that is in three-dimensional space and has a minimum mean value of distances from the optical centers of the cameras in the planar camera array.

Optionally, as an embodiment, the rectangular grid meets that a sum of squares of distances between the projected points of the optical centers of the cameras in all the cameras and the target grid points of the cameras is minimal.

Optionally, as an embodiment, a z axis of the target camera coordinate system of each of the cameras is the same as the normal direction of the target plane, an x axis of the target camera coordinate system of each of the cameras is the same as a direction of a first grid line in the rectangular grid, a y axis of the target camera coordinate system of each of the cameras is the same as a direction of a second grid line in the rectangular grid, and the first grid line and the second grid line are perpendicular to each other.

Optionally, as an embodiment, the third determining unit 950 is specifically configured to determine a target x axis, a target y axis, and the target z axis according to x axes, y axes, and the z axes of the current camera coordinate systems of all the cameras in the planar camera array, where a direction of the target x axis is a mean direction of the x axes of the current camera coordinate systems of all the cameras, a direction of the target y axis is a mean direction of the y axes of the current camera coordinate systems of all the cameras, and a direction of the target z axis is a mean direction of the z axes of the current camera coordinate systems of all the cameras; and determine a target camera coordinate system of each of the cameras by using a grid point in the rectangular grid that is nearest to the projected point of the optical center of each of the cameras as an origin, where a z axis of the target camera coordinate system of each of the cameras is the target z axis or a z axis that is among the z axes of the current camera coordinate systems of all the cameras and has a minimum angle deviation from the target z axis, an x axis of the target coordinate system of each of the cameras is the target x axis or an x axis that is among x axes of the current camera coordinate systems of all the cameras and has a minimum angle deviation from the target x axis, and a y axis of the target coordinate system of each of the cameras is the target y axis or a y axis that is among y axes of the current camera coordinate systems of all the cameras and has a minimum angle deviation from the target y axis.

Optionally, as an embodiment, the registering unit 960 is specifically configured to perform, according to a spatial location relationship between the current camera coordinate system and the target camera coordinate system of each of the cameras in the planar camera array, coordinate conversion on an image collected in the current camera coordinate system by each of the cameras, to obtain an image collected in the target camera coordinate system by each of the cameras; and register images collected in respective target camera coordinate systems by adjacent cameras in the planar camera array.

Figure 10:
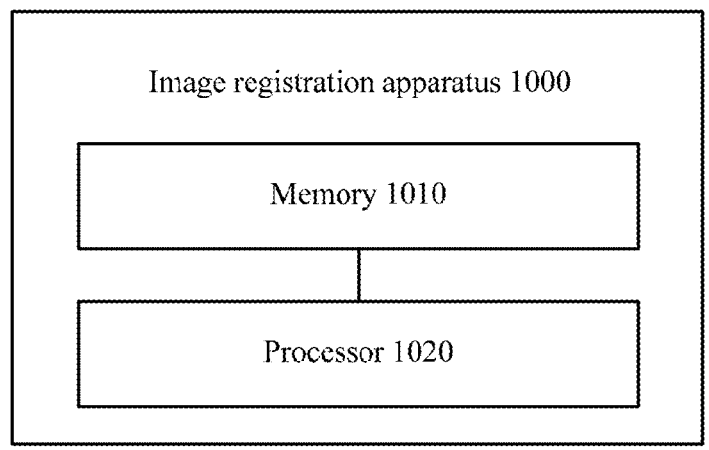
FIG. 10 is a schematic block diagram of an image registration apparatus according to an embodiment of the present disclosure.

FIG. 10 is a schematic block diagram of an image registration apparatus according to an embodiment of the present disclosure. The image registration apparatus 1000 shown in FIG. 10 includes:

a memory 1010, configured to store a program; and a processor 1020, configured to execute the program, where when the program is executed, the processor 1020 is specifically configured to: determine a target plane according to a location of an optical center of each of cameras in a planar camera array; orthogonally project the optical center of each of the cameras in the planar camera array onto the target plane, to obtain a projected point of the optical center of each of the cameras; generate a rectangular grid on the target plane according to the projected points of the optical centers of the cameras in the planar camera array, where a quantity of rows of the rectangular grid is the same as a quantity of rows of the planar camera array, and a quantity of columns of the rectangular grid is the same as a quantity of columns of the planar camera array; obtain a target grid point of each of the cameras according to the rectangular grid, where the target grid point of each of the cameras is a grid point that is among grid points of the rectangular grid and is nearest to the projected point of the optical center of each of the cameras; determine a target camera coordinate system of each of the cameras by using the target grid point of each of the cameras as an origin; and register, according to spatial location relationships between the cameras in the planar camera array and the target camera coordinate systems, images collected by the cameras in the planar camera array.

In this embodiment of the present disclosure, a target plane and a rectangular grid on the target plane are determined first, and a grid point of the rectangular grid is used as an origin to re-establish a target camera coordinate system of a camera. Because target camera coordinate systems of cameras in a planar camera array are located on a same plane and are accurately aligned with each other, the accurately aligned camera coordinate systems can greatly reduce complexity of an algorithm for subsequent image registration, thereby implementing real-time rendering of a virtual viewpoint.

Optionally, as an embodiment, the target plane is a plane that is in three-dimensional space and has a minimum mean value of distances from the optical centers of the cameras in the planar camera array.

Optionally, as an embodiment, the processor 1020 is specifically configured to acquire current camera coordinate systems of the cameras in the planar camera array; determine a target z axis according to z axes of the current camera coordinate systems of the cameras, where a direction of the target z axis is a mean direction of the z axes of the current camera coordinate systems of the cameras in the planar camera array; and determine, by using the direction of the target z axis as a normal direction of the target plane, the target plane that is in three-dimensional space and has a minimum mean value of distances from the optical centers of the cameras in the planar camera array.

Optionally, as an embodiment, the rectangular grid meets that a sum of squares of distances between the projected points of the optical centers of the cameras in all the cameras and the target grid points of the cameras is minimal.

Optionally, as an embodiment, a z axis of the target camera coordinate system of each of the cameras is the same as the normal direction of the target plane, an x axis of the target camera coordinate system of each of the cameras is the same as a direction of a first grid line in the rectangular grid, a y axis of the target camera coordinate system of each of the cameras is the same as a direction of a second grid line in the rectangular grid, and the first grid line and the second grid line are perpendicular to each other.

Optionally, as an embodiment, the processor 1020 is specifically configured to determine a target x axis, a target y axis, and the target z axis according to x axes, y axes, and the z axes of the current camera coordinate systems of all the cameras in the planar camera array, where a direction of the target x axis is a mean direction of the x axes of the current camera coordinate systems of all the cameras, a direction of the target y axis is a mean direction of the y axes of the current camera coordinate systems of all the cameras, and a direction of the target z axis is a mean direction of the z axes of the current camera coordinate systems of all the cameras; and determine a target camera coordinate system of each of the cameras by using a grid point in the rectangular grid that is nearest to the projected point of the optical center of each of the cameras as an origin, where a z axis of the target camera coordinate system of each of the cameras is the target z axis or a z axis that is among the z axes of the current camera coordinate systems of all the cameras and has a minimum angle deviation from the target z axis, an x axis of the target coordinate system of each of the cameras is the target x axis or an x axis that is among x axes of the current camera coordinate systems of all the cameras and has a minimum angle deviation from the target x axis, and a y axis of the target coordinate system of each of the cameras is the target y axis or a y axis that is among y axes of the current camera coordinate systems of all the cameras and has a minimum angle deviation from the target y axis.

Optionally, as an embodiment, the processor 1020 is specifically configured to perform, according to a spatial location relationship between the current camera coordinate system and the target camera coordinate system of each of the cameras in the planar camera array, coordinate conversion on an image collected in the current camera coordinate system by each of the cameras, to obtain an image collected in the target camera coordinate system by each of the cameras; and register images collected in respective target camera coordinate systems by adjacent cameras in the planar camera array.

It should be understood that, the term "and/or" in this embodiment of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory, a random access memory, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image registration method comprising:
   determining a target plane according to a location of an optical center of each camera in a planar camera array without adjusting a location of each camera in the planar camera array;
   orthogonally projecting the optical center of each of the cameras in the planar camera array onto the target plane along a projected line from the optical center of each camera to the target plane to obtain a projected point of the optical center of each of the cameras, wherein the projected point is an intersecting point of the projected line and the target plane;

generating a rectangular grid on the target plane according to the projected points of the optical centers of the cameras in the planar camera array, wherein a quantity of rows of the rectangular grid is the same as a quantity of rows of the planar camera array, and a quantity of columns of the rectangular grid is the same as a quantity of columns of the planar camera array;

obtaining a target grid point of each of the cameras according to the rectangular grid, wherein the target grid point of each of the cameras is a grid point that is among grid points of the rectangular grid and is nearest to the projected point of the optical center of each of the cameras;

determining a target camera coordinate system of each of the cameras by using the target grid point of each of the cameras as an origin; and registering, according to spatial location relationships between current camera coordinate systems and the target camera coordinate systems in the cameras in the planar camera array, images collected by the cameras in the planar camera array.

2. The method according to claim 1, wherein the target plane is a plane that is in three-dimensional space and has a minimum mean value of distances from the optical centers of the cameras in the planar camera array.

3. The method according to claim 1, wherein determining the target plane according to the location of the optical center of each of the cameras in the planar camera array comprises:

acquiring the current camera coordinate systems of the cameras in the planar camera array;

determining a target z axis according to z axes of the current camera coordinate systems of the cameras, wherein a direction of the target z axis is a mean direction of the z axes of the current camera coordinate systems of the cameras in the planar camera array; and determining, by using the direction of the target z axis as a normal direction of the target plane, the target plane that is in three-dimensional space and has a minimum mean value of distances from the optical centers of the cameras in the planar camera array.

4. The method according to claim 1, wherein in the rectangular grid, a sum of a square value of each distance between a projected point and a target grid point of all the cameras is a minimum value.

5. The method according to claim 1, wherein a z axis of the target camera coordinate system of each of the cameras is the same as a normal direction of the target plane, an x axis of the target camera coordinate system of each of the cameras is the same as a direction of a first grid line in the rectangular grid, a y axis of the target camera coordinate system of each of the cameras is the same as a direction of a second grid line in the rectangular grid, and the first grid line and the second grid line are perpendicular to each other.

6. The method according to claim 1, wherein determining the target camera coordinate system of each of the cameras by using the target grid point of each of the cameras as the origin comprises:

determining a target x axis, a target y axis, and a target z axis according to x axes, y axes, and z axes of the current camera coordinate systems of all the cameras in the planar camera array, wherein a direction of the target x axis is a mean direction of the x axes of the current camera coordinate systems of all the cameras, a direction of the target y axis is a mean direction of the y axes of the current camera coordinate systems of all the cameras, and a direction of the target z axis is a mean direction of the z axes of the current camera coordinate systems of all the cameras; and determining a target camera coordinate system of each of the cameras by using a grid point in the rectangular grid that is nearest to the projected point of the optical center of each of the cameras as an origin, wherein a z axis of the target camera coordinate system of each of the cameras is the target z axis or a z axis that is among the z axes of the current camera coordinate systems of all the cameras and has a minimum angle deviation from the target z axis, an x axis of the target coordinate system of each of the cameras is the target x axis or an x axis that is among x axes of the current camera coordinate systems of all the cameras and has a minimum angle deviation from the target x axis, and a y axis of the target coordinate system of each of the cameras is the target y axis or a y axis that is among y axes of the current camera coordinate systems of all the cameras and has a minimum angle deviation from the target y axis.

7. The method according to claim 1, wherein registering, according to the spatial location relationships between the current camera coordinate systems and the target camera coordinate systems in the cameras in the planar camera array, the images collected by the cameras in the planar camera array comprises:

performing, according to a spatial location relationship between the current camera coordinate system and the target camera coordinate system of each of the cameras in the planar camera array, coordinate conversion on an image collected in the current camera coordinate system by each of the cameras, to obtain an image collected in the target camera coordinate system by each of the cameras; and registering images collected in respective target camera coordinate systems by adjacent cameras in the planar camera array.

8. An image registration apparatus comprising:

a processor, a memory, and a projector, wherein the memory and the projector are coupled to the processor, and the memory stores processor-readable instructions which when executed cause the processor to implement operations including:

determining a target plane according to a location of an optical center of each camera in a planar camera array without adjusting a location of each camera in the planar camera array;

wherein the projector is configured to orthogonally project the optical center of each of the cameras in the planar camera array onto the target plane along a projected line from the optical center of each camera to the target plane to obtain a projected point of the optical center of each of the cameras, wherein the projected point is an intersecting point of the projected line and the target plane;

generating a rectangular grid on the target plane according to the projected points of the optical centers of the cameras in the planar camera array, wherein a quantity of rows of the rectangular grid is the same as a quantity of rows of the planar camera array, and a quantity of columns of the rectangular grid is the same as a quantity of columns of the planar camera array;

obtaining a target grid point of each of the cameras according to the rectangular grid, wherein the target grid point of each camera is a grid point that is among grid points of the rectangular grid and is nearest to the projected point of the optical center of each of the cameras;

determining a target camera coordinate system of each camera by using the target grid point of each camera as an origin; and registering, according to spatial location relationships between the cameras in the planar camera array and the target camera coordinate systems, images collected by the cameras in the planar camera array.

9. The apparatus according to claim 8, wherein the target plane is a plane that is in three-dimensional space and has a minimum mean value of distances from the optical centers of the cameras in the planar camera array.

10. The apparatus according to claim 8, wherein the operations further include:

acquiring the current camera coordinate systems of the cameras in the planar camera array;

determining a target z axis according to z axes of the current camera coordinate systems of the cameras, wherein a direction of the target z axis is a mean direction of the z axes of the current camera coordinate systems of the cameras in the planar camera array; and determining, by using the direction of the target z axis as a normal direction of the target plane, the target plane that is in three-dimensional space and has a minimum mean value of distances from the optical centers of the cameras in the planar camera array.

11. The apparatus according to claim 8, wherein in the rectangular grid, a sum of a square value of each distance between a projected point and a target grid point of all the cameras is a minimum value.

12. The apparatus according to claim 8, wherein a z axis of the target camera coordinate system of each of the cameras is the same as a normal direction of the target plane, an x axis of the target camera coordinate system of each of the cameras is the same as a direction of a first grid line in the rectangular grid, a y axis of the target camera coordinate system of each of the cameras is the same as a direction of a second grid line in the rectangular grid, and the first grid line and the second grid line are perpendicular to each other.

13. The apparatus according to claim 8, wherein the operations further include:

determining a target x axis, a target y axis, and a target z axis according to x axes, y axes, and z axes of the current camera coordinate systems of all the cameras in the planar camera array,
wherein a direction of the target x axis is a mean direction of the x axes of the current camera coordinate systems of all the cameras, a direction of the target y axis is a mean direction of the y axes of the current camera coordinate systems of all the cameras, and a direction of the target z axis is a mean direction of the z axes of the current camera coordinate systems of all the cameras; and determining a target camera coordinate system of each of the cameras by using a grid point in the rectangular grid that is nearest to the projected point of the optical center of each of the cameras as an origin,
wherein a z axis of the target camera coordinate system of each of the cameras is the target z axis or a z axis that is among the z axes of the current camera coordinate systems of all the cameras and has a minimum angle deviation from the target z axis, an x axis of the target coordinate system of each of the cameras is the target x axis or an x axis that is among x axes of the current camera coordinate systems of all the cameras and has a minimum angle deviation from the target x axis, and a y axis of the target coordinate system of each of the cameras is the target y axis or a y axis that is among y axes of the current camera coordinate systems of all the cameras and has a minimum angle deviation from the target y axis.

14. The apparatus according to claim 8, wherein the operations further include:

performing, according to a spatial location relationship between the current camera coordinate system and the target camera coordinate system of each of the cameras in the planar camera array, coordinated conversion on an image collected in the current camera coordinate system by each of the cameras to obtain an image collected in the target camera coordinate system by each of the cameras; and registering images collected in respective target camera coordinate systems by adjacent cameras in the planar camera array.

15. A non-transitory computer readable medium comprising processor-executable instructions which when executed by a processor cause the processor to implement the following:

determining a target plane according to a location of an optical center of each camera in a planar camera array without adjusting a location of each camera in the planar camera array;

orthogonally projecting the optical center of each of the cameras in the planar camera array onto the target plane along a projected line from the optical center of each camera to the target plane, to obtain a projected point of the optical center of each of the cameras, wherein the projected point is an intersecting point of the projected line and the target plane;

generating a rectangular grid on the target plane according to the projected points of the optical centers of the cameras in the planar camera array,
wherein a quantity of rows of the rectangular grid is the same as a quantity of rows of the planar camera array, and a quantity of columns of the rectangular grid is the same as a quantity of columns of the planar camera array;

obtaining a target grid point of each of the cameras according to the rectangular grid, wherein the target grid point of each of the cameras is a grid point that is among grid points of the rectangular grid and is nearest to the projected point of the optical center of each of the cameras;

determining a target camera coordinate system of each of the cameras by using the target grid point of each of the cameras as an origin; and registering, according to spatial location relationships between current camera coordinate systems and the target camera coordinate systems in the cameras in the planar camera array, images collected by the cameras in the planar camera array.

16. The non-transitory computer readable medium according to claim 15, wherein the target plane is a plane that is in three-dimensional space and has a minimum mean value of distances from the optical centers of the cameras in the planar camera array.

17. The non-transitory computer readable medium according to claim 15, wherein determining the target plane according to the location of the optical center of each of the cameras in the planar camera array comprises:

acquiring the current camera coordinate systems of the cameras in the planar camera array;

determining a target z axis according to z axes of the current camera coordinate systems of the cameras, wherein a direction of the target z axis is a mean direction of the z axes of the current camera coordinate systems of the cameras in the planar camera array; and determining, by using the direction of the target z axis as a normal direction of the target plane, the target plane that is in three-dimensional space and has a minimum mean value of distances from the optical centers of the cameras in the planar camera array.

18. The non-transitory computer readable medium according to claim 15, wherein in the rectangular grid, a sum of a square value of each distance between a projected point and a target grid point of all the cameras is a minimum value.

19. The non-transitory computer readable medium according to claim 15, wherein a z axis of the target camera coordinate system of each of the cameras is the same as a normal direction of the target plane, an x axis of the target camera coordinate system of each of the cameras is the same as a direction of a first grid line in the rectangular grid, a y axis of the target camera coordinate system of each of the cameras is the same as a direction of a second grid line in the rectangular grid, and the first grid line and the second grid line are perpendicular to each other.

20. The non-transitory computer readable medium according to claim 15, wherein determining the target camera coordinate system of each of the cameras by using the target grid point of each of the cameras as the origin comprises:

determining a target x axis, a target y axis, and a target z axis according to x axes, y axes, and z axes of the current camera coordinate systems of all the cameras in the planar camera array, wherein a direction of the target x axis is a mean direction of the x axes of the current camera coordinate systems of all the cameras, a direction of the target y axis is a mean direction of the y axes of the current camera coordinate systems of all the cameras, and a direction of the target z axis is a mean direction of the z axes of the current camera coordinate systems of all the cameras; and determining a target camera coordinate system of each of the cameras by using a grid point in the rectangular grid that is nearest to the projected point of the optical center of each of the cameras as an origin, wherein a z axis of the target camera coordinate system of each of the cameras is the target z axis or a z axis that is among the z axes of the current camera coordinate systems of all the cameras and has a minimum angle deviation from the target z axis, an x axis of the target coordinate system of each of the cameras is the target x axis or an x axis that is among x axes of the current camera coordinate systems of all the cameras and has a minimum angle deviation from the target x axis, and a y axis of the target coordinate system of each of the cameras is the target y axis or a y axis that is among y axes of the current camera coordinate systems of all the cameras and has a minimum angle deviation from the target y axis.

* * * * *